UNITED STATES PATENT OFFICE.

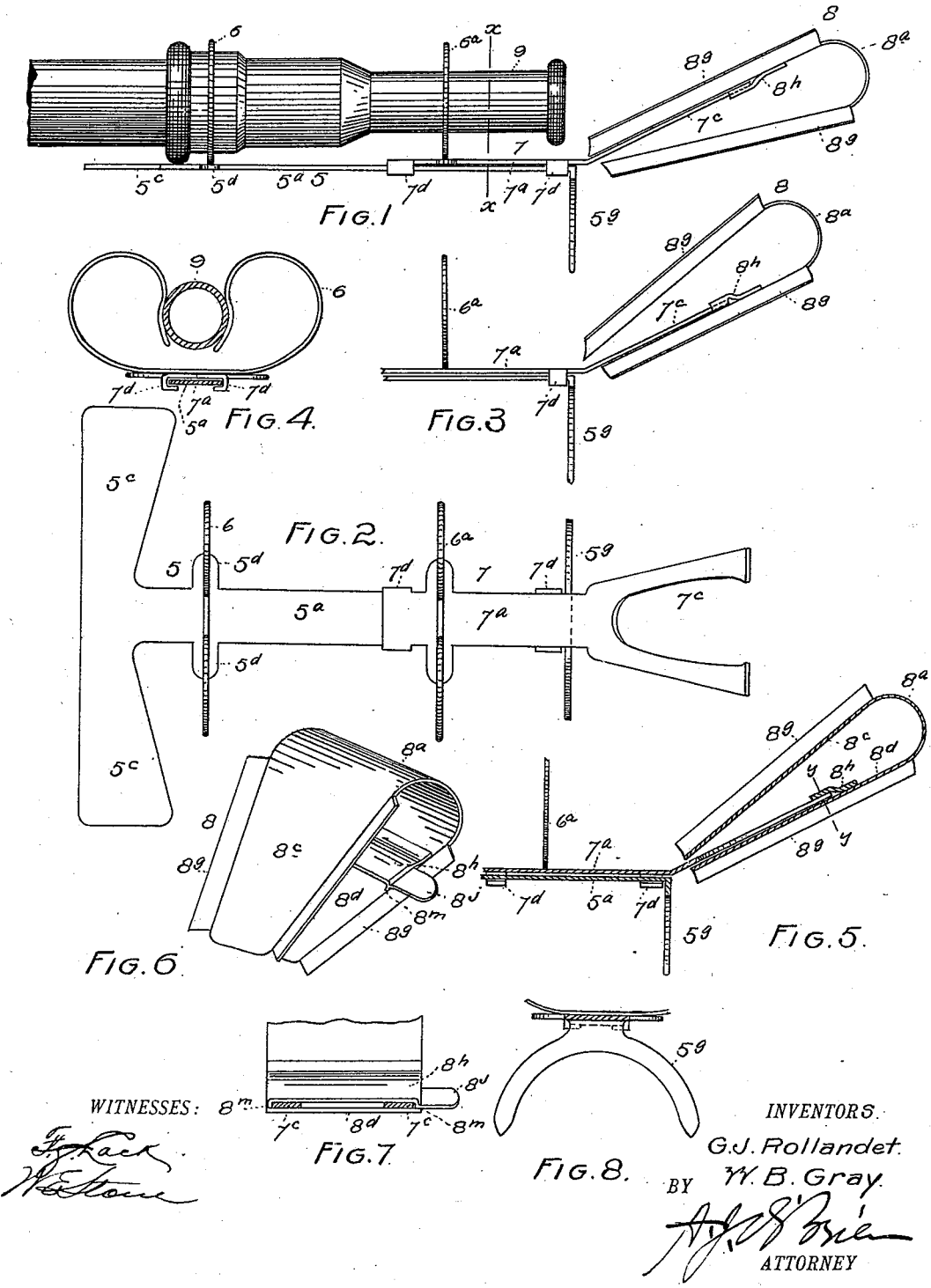

GERRIT J. ROLLANDET AND WILLIAM B. GRAY, OF DENVER, COLORADO, ASSIGNORS OF ONE-HALF TO FRED S. LACK AND WILLIAM E. STONE, OF SAME PLACE.

NOZZLE-HOLDER AND SPRAYING ATTACHMENT FOR GARDEN-HOSE.

SPECIFICATION forming part of Letters Patent No. 553,940, dated February 4, 1896.

Application filed April 11, 1895. Serial No. 545,415. (No model.)

*To all whom it may concern:*

Be it known that we, GERRIT J. ROLLANDET and WILLIAM B. GRAY, citizens of the United States of America, residing at Denver, in the county of Arapahoe and State of Colorado, have invented certain new and useful Improvements in a Nozzle-Holder and Spraying Attachment for Garden-Hose; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to an improved nozzle-holder and spraying attachment for garden-hose; and it consists of the features hereinafter described and claimed, all of which will be fully understood by reference to the accompanying drawings, in which is illustrated an embodiment thereof.

In the drawings, Figure 1 is a side elevation of the device, showing the hose-nozzle in place. Fig. 2 is a plan view of the nozzle-holder with the spraying-shoe detached. Fig. 3 is a fragmentary view of the device, the position of the spraying-shoe being reversed from that shown in Fig. 1. Fig. 4 is a vertical cross-section taken on the line $xx$, Fig. 1, looking toward the left. Fig. 5 is a vertical longitudinal section of the device, the rear part of the nozzle-holder being broken away. Fig. 6 is a detail view in perspective illustrating the spraying-shoe. Fig. 7 is a section taken on the line $yy$, Fig. 5, the spring-plate being shown in elevation. Fig. 8 is a front view of the device partly broken away.

Similar reference characters indicate corresponding parts in the views.

Let the numeral 5 designate the base, comprising the central forwardly-extending arm $5^a$ and the wings $5^c$ projecting laterally from the arm's rear extremity. To the arm $5^a$ is attached the spring 6. As shown in the drawings, this spring is composed of a piece of spring-wire having its extremities bent upwardly and inwardly toward each other and fashioned to embrace and support the hose-nozzle. The spring 6 is preferably secured to the arm $5^a$ by brazing or soldering, the arm being provided with lateral projections $5^d$ to give the spring a better bearing-surface and to facilitate its attachment to the arm. The forward extremity of the arm $5^a$ is provided with a depending projection $5^g$ bent at right angles, or approximately at right angles, to the body of the arm. This part $5^g$ is adapted to raise the forward extremity of the device sufficiently to give the nozzle the proper inclination. It is also adapted to stick into the ground whereby the device may be firmly anchored and the inclination of the nozzle changed at pleasure. To this end the part $5^g$ is forked and its free extremities sharpened, whereby they are adapted to be pressed easily into the earth. In the drawings, the base of the device is, for convenience, shown in a horizontal position. In use, however, this arm will be more or less inclined to the plane of the surface upon which the device rests, unless the part $5^g$ is pressed into the earth to its full length.

To the arm $5^a$ is slidingly attached the forward extension 7, comprising the arm $7^a$ and the inclined forked extremity $7^c$. The arm $7^a$ is parallel with the arm $5^a$ and is provided with clasps $7^d$ engaging the arm $5^a$, whereby the two parts are adjustably connected. The part 7 also carries a spring $6^a$ of substantially the same construction as that already described and attached to the arm $5^a$ of the base.

The spraying-shoe 8 consists of a plate widest in the center and tapering toward its extremities. This shoe is formed by bending the plate so that its extremities nearly touch each other. The shoe is thus deepest, as well as widest, at the bend $8^a$. The shoe is so attached to the fork or extension $7^c$ that its two portions $8^c$ and $8^d$ are unequally inclined when presented to the water. These parts of the shoe, as shown in the drawings, are symmetrically inclined, and the unequal inclination when in use results from the manner of attaching the shoe to the forked extension. It will be observed that this extension is always attached to the part $8^d$ of the shoe. Hence the part $8^c$ has a greater inclination when in use (see Figs. 3 and 5) than the part $8^d$, the inclination of the last-named part being the same no matter which part is used to spray the water.

If the extension $7^c$ were attached to the shoe midway between the parts $8^c$ and $8^d$, the inclination of these parts when in use—that is, when presented to the water—would be the same. The extension being, however, always attached to the same part of the shoe, the result stated must necessarily follow. These two parts $8^c$ and $8^d$ have laterally-inclined flanges $8^g$, adapted to facilitate the spreading or spraying of the water as it issues from the nozzle 9. To the inner surface of one part of the shoe, as $8^d$, is attached, as by soldering, a spring-plate $8^h$, having side flanges $8^m$ and a small projection $8^j$. The function of this spring-plate is to grasp the forked extremity $7^e$ of the part 7 and thus maintain the shoe in place. The flanges $8^m$ prevent lateral displacement of the forked part $7^e$. The projection $8^j$ facilitates the raising of the spring-plate when it is desired to attach the spraying-shoe to the nozzle-holder.

From the foregoing description it will be understood that the spraying-shoe is detachable and reversible. Its position, when the surface of less inclination is presented to the water, is illustrated in Fig. 1. Its position, when the opposite surface or that having the greater inclination is presented to the issuing stream, is illustrated in Figs. 3 and 5.

The device is shown full length in Figs. 1 and 2. It may be shortened by sliding the part 7 toward the left, or so as to bring the springs 6 and $6^a$ of the parts 5 and 7 nearer together. By virtue of its adjustability the device is adapted for use with nozzles of all sizes.

The use of the device will be readily understood from the foregoing description.

The hose-nozzle is grasped and held in place by the springs 6 and $6^a$. As the stream of water issuing therefrom engages the inclined face of the shoe 8, the stream is converted into spray whose jets are directed upward by the shoe on an incline depending upon the portion of the shoe with which the water comes in contact. If it is desired to throw the jets or sprays quite high, the side $8^c$ is placed in the path of the water, while if it is desired to throw the jets to a less height the opposite side, $8^d$, is employed. The shoe may be easily and quickly changed from one position to another. If it is not desired to convert the stream into a spray, the shoe 8 is not used, in which event the device serves simply as a holder for the nozzle.

Having thus described our invention, what we claim is—

1. A combined nozzle-holder and spraying device comprising the base carrying a spring adapted to embrace the nozzle, a forward extension and a reversible spraying-shoe comprising a bent plate having inclined sides, the shoe being so attached to the extension that the two sides are unequally inclined when presented to the water, substantially as described.

2. A combined nozzle-holder and spraying device comprising the extensible body part having springs adapted to embrace the nozzle, and the reversible spraying-shoe having two inclined sides, said shoe being so attached to the body part that the two sides are unequally inclined when presented to the water, substantially as described.

3. A combined nozzle-holder and spraying device comprising the body part having a spring adapted to embrace the nozzle, the inclined forward extension, and the shoe comprising a bent plate having two tapering faces provided with inclined lateral flanges, substantially as described.

4. A combined nozzle-holder and spraying device comprising an extensible body part having springs adapted to embrace the nozzle, a depending projection and a forward extension and a reversible spraying-shoe composed of a bent plate, said shoe being so attached to the extension of the base that its two sides are unequally inclined when pre sented to the water, substantially as described.

In testimony whereof we affix our signatures in the presence of two witnesses.

GERRIT J. ROLLANDET.
WILLIAM B. GRAY.

Witnesses:
CHAS. E. DAWSON,
F. S. LACK.